Dec. 19, 1967  F. A. FREESE ETAL  3,358,580
LOUVER ASSEMBLY INCLUDING SEPARATING TRAPS
Filed Aug. 27, 1965
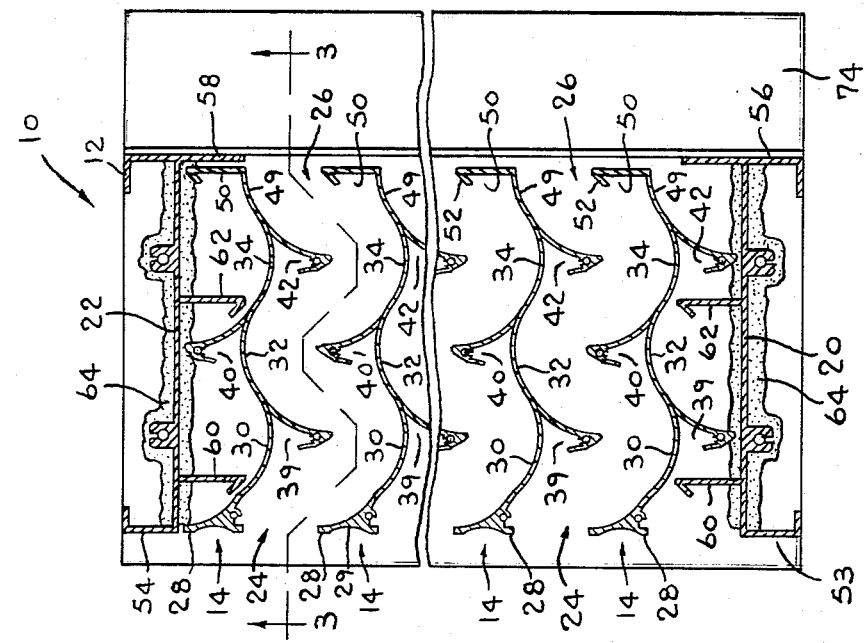
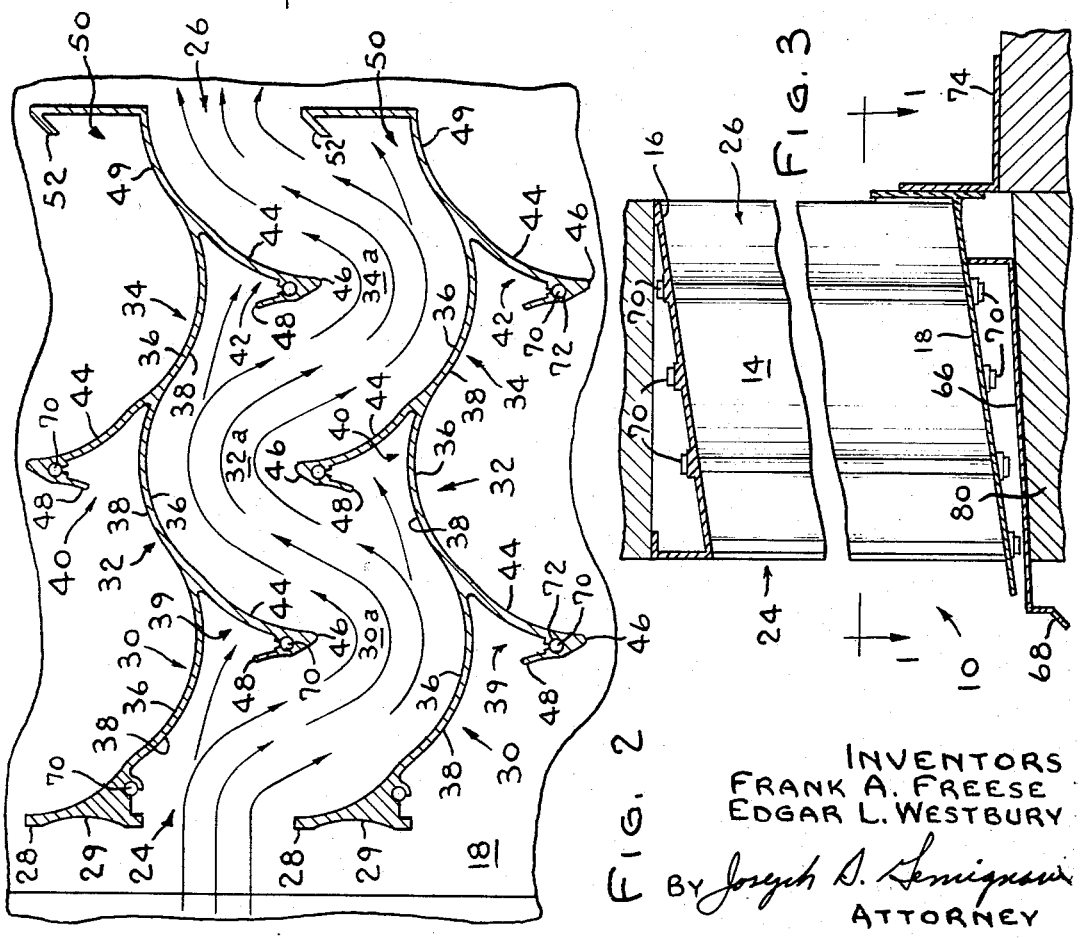
INVENTORS
FRANK A. FREESE
EDGAR L. WESTBURY
By Joseph D. Semignani
ATTORNEY United States Patent Office 3,358,580
Patented Dec. 19, 1967

3,358,580
**LOUVER ASSEMBLY INCLUDING
SEPARATING TRAPS**
Frank A. Freese and Edgar L. Westbury, Madison, Wis.,
assignors to Wehr Corporation, Milwaukee, Wis., a
corporation of Wisconsin
Filed Aug. 27, 1965, Ser. No. 483,199
11 Claims. (Cl. 98—121)

ABSTRACT OF THE DISCLOSURE

A louver assembly having a plurality of louver blades extending between an inlet and an outlet in a manner to permit flow of air from the inlet to the outlet. Each of the louver blades is made up of a plurality of concave-convex arcuate segments arranged serially in the direction of flow between the inlet and outlet. The concave and convex faces of adjacent louver blades face each other and the concave and convex faces are alternately arranged in each louver blade to thereby provide a flow path having a plurality of changes in direction between the inlet and outlet. Each of the louver blades is provided with trap portions positioned at the convex surfaces thereof, that is at the points at which the air is made to change direction. Each trap portion extends into the air flow path, toward the inlet and includes a first portion extending away from its respective louver blade and a second portion connected to the first portion and extending back toward but spaced from that louver blade. Each louver blade at the outlet end terminates in a similar trap portion to provide a final point of separation prior to the air leaving the louver assembly. The frame for the louver assembly includes vertical side panels provided with similar trap portions which extend toward the end louver blades, and the louver blades and side panels are supported on a sloping frame wall which serves as a run-off for moisture accumulated by the trap portions.

---

This invention relates to louver assemblies and to an improved louver blade configuration for such assemblies.

The function of louver assemblies is well known, for example to prevent entry of a foreign media (such as rain) into a circulating system with a primary flowing media (such as air). Various louver assembly constructions have been proposed in the past to accomplish this function. Generally such assemblies have had various shortcomings, such as they did not insure acceptable separation of foreign media over a wide range of air velocities and without regard to the direction from which the air and entrained foreign media enters the louver assembly. Furthermore, they do not insure effective entrapment from the standpoint of clearing the louver assembly of entrapped media, i.e. without complicating the louver assembly. Continued exposure of the flowing primary media to the foreign media already separated presents the possibility of the foreign media again becoming entrained in the flowing media.

A general object of this invention is to provide an improved louver assembly which more effectively separates a foreign media from a primary flowing media without undue interference with the flow of primary media except at the point at which the desired separation is to take place.

A more specific object of this invention is to provide an improved louver arrangement which not only more effectively separates foreign media from a primary flow but also facilitates removal of the foreign media so separated from the louver assembly.

A further, specific object of this invention is to concentrate the separation of foreign media from the primary flow and reduce the possibility of the foreign media so separated being returned to the primary flow stream.

Another, more specific object of this invention is to provide an improved louver blade construction.

For the achievement of these and other objects of this invention, the louver assembly constructed in accordance with this invention includes a plurality of vanes or louver blades extending between an inlet and an outlet in a manner to permit flow of air from the inlet to the outlet. Each of the louver blades includes a plurality of concave-convex arcuate segments arranged serially in the direction of flow between the inlet and outlet. In the louver assembly, the concave and convex faces of adjacent louver blades face toward each other and, in the preferred embodiment, the concave faces of each louver blade are alternately arranged with the convex faces thereof to thereby provide a smooth, continuous flow path for air from the inlet to the outlet. Each of the louver blades is provided with trap portions positioned at the points at which the air is made to change direction by the louver blades in its passage from the inlet to the outlet. The trap portions extend into the path defined by adjacent louvers and are directed toward the inlet. Again in the preferred embodiment, the trap portions are provided at the convex surfaces of each louver assembly and opposite the concave surfaces of an adjacent louver blade and, furthermore, when assembled, the extension of the trap portions of adjacent louver assemblies into the same paths overlap. The individual louver configuration is particularly advantageous in that it permits the louvers to be arranged adjacent each other to define a restricted flow path and with the traps alternately arranged on opposite sides of the path for effective separation.

Other objects and advantages will be pointed out in, or be apparent from, the specification and claims, as will obvious modifications of the embodiment shown in the drawings, in which:

FIG. 1 is a sectional view taken generally along line 1—1 of FIG. 3;

FIG. 2 is an enlarged view of a pair of the adjacent louver blades illustrated in FIG. 1; and FIG. 3 is a sectional view taken generally along line 3—3 of FIG. 1.

For convenience, this invention will be discussed in connection with a louver assembly intended to separate rain, or the like, from air to prevent the rain being drawn into a typical air distributing system; however, it will be appreciated that this invention is not limited to such a use but has application generally to arrangements intended to separate an entrained foreign or secondary media from a primary flowing media. With particular reference to the drawing, louver assembly 10 includes a frame 12 and a plurality of louver blades 14. The frame is made up of top and bottom walls 16 and 18 and side walls 20 and 22 cooperating to form a duct-like louver enclosure having relatively spaced inlet and outlet openings 24 and 26. Louver blades 14 are arranged in the frame between the inlet and outlet openings and, in a manner to be described more completely hereinafter, permit air to flow freely from the inlet to the outlet.

The louver blades are of identical configuration and for that reason each blade will not be described separately and the same reference numerals will be applied to identical elements of the louver blades. Starting at the inlet end of the louver assembly, each louver blade includes a vertical flange 28 arranged parallel to and presented outwardly of the inlet opening. Inwardly of the vertical flanges the louver blades are made up of generally arcuate, concave-convex segments 30, 32 and 34. The concave-convex segments are arranged serially between the inlet and outlet with the concave face 36 of one blade presented to, or facing, the convex face 38 of a similar segment of an adjacent louver blade. The louver blades are relatively spaced apart in a direction transverse to the direction of flow between the inlet and outlet and extend between the top and bottom walls of the frame. This arrangement defines restricted, undulating flow paths through the assembly made up of oppositely directed arcuate portions 30a, 32a and 34a which cause the air to change direction several times as it flows through the louver assembly. Preferably the concave-convex segments of each louver blade are arranged with their concave surfaces alternating with the convex surfaces to thereby define a smooth undulating flow path through the louver assembly. With this arrangement air flows through the louver assembly with a minimum amount of turbulence.

The blade flanges 28 are provided with depression 29 and this arrangement of vertical flanges and depressions is preferred for aesthetic considerations as it offers a wide latitude in available architectural design, a feature which is extremely desirable in louver assemblies of this type.

To remove entrained rain, or the like, from air as it flows through the louver assembly each louver blade is provided with traps 39, 40 and 42. The traps are staggered on opposite faces of each louver blade and are positioned at points in the flow path where, by virtue of the path defined, the flowing air is made to change direction. This affords a design which facilitates separation by utilizing the tendency of the heavier rain drops to resist the changes of direction. In the illustrated preferred construction the traps are located at the convex portions of the louvers. Structurally each trap includes a first portion 44 which forms a generally smooth extension of its adjacent downstream concave surface to facilitate fabrication and are disposed at, or overlap, the adjacent upstream convex surface. Portions 44 extend from the louver blades into the flow paths and are directed toward the inlet terminating in hook-shaped ends 46 formed by a second trap portion 48 turned back on trap portion 44 and extending back toward but terminating in spaced relation from its respective convex. With this arrangement the traps are strategically located to provide optimum entrapment of entrained rain. More particularly, after air has entered the louver assembly the major portion thereof follows the curvature of the concave face as it passes through one segment of the flow path with the heavier entrained matter, the rain, tending to adhere more closely to the convex face. As the air passes to the next segment of the flow path, from segment 30a to 32a, it is made to change direction toward the concave side of the next segment. However, the heavier rain drops resist the change in direction and tend to proceed in a generally tangential direction, with respect to the concave face they have just left, and flow into trap 40. The rain which remains entrained will again tend to adhere closely to the next downstream concave face, resist the next change in direction and is caught in the next trap 42.

This arrangement achieves effective separation regardless of the angle at which air is presented to the inlet. If at right angles to the inlet some rain is trapped immediately at trap 38 whereas the air, and the remainder of the entrained rain, is turned to follow the concave surface of segment 30a of the flow path with further entrapment of rain in traps 40 and 42 occurring as described above. Entry of air at other than a right angle to the inlet, either above or below the perpendicular path to the inlet as viewed in FIG. 1, will either enhance separation at the first trap 38 or the second trap 40 and in any event will insure effective separation. If entering at an angle from below the perpendicular line, the initial change in direction required to follow convex surface of segment 30a is so extreme that a major portion of the rain resists this change and is caught at the first trap. If approaching from the opposite side of the perpendicular line the air is initially directed toward the concave surface of segment 30a so that the first change in direction is again extreme and a major portion of the rain is caught at the second trap. Therefore, rain is effectively separated regardless of the angle of approach of the air. At the outlet each louver blade ends in a half concave-convex segment 49 with a final trap 50 extending from the convex side thereof parallel to the outlet and terminating in hook-shaped end 52 to provide a final point of separation should any rain remain entrained.

The construction discussed to this point achieves effective separation of rain and the like from a flowing media such as air. More particularly, the smooth flow paths which are defined by the louver blades result in air flow with a minimum of turbulence which is desirable from the standpoint of separating the entrained media from the air since any turbulence would have the tendency of holding foreign media in suspension in the air thereby rendering it difficult to separate it out. Accordingly, the arrangement of alternating concave-convex surfaces, and the correspondingly defined flow paths, serves two functions. It reduces the amount of turbulence of the air as it flows through the assembly and, secondly, it permits the traps to be strategically positioned to catch the heavier foreign media as it resists the change in direction forced on the air by the configuration of the flow path. By directing the trap portions back toward the inlet effective separation is achieved and, moreover, by turning the end of the trap portion back on itself, the danger of the trapped rain sliding off the trap back into the air stream is reduced to a minimum. Thus not only is rain effectively separated but it is also concentrated at points in the louver assembly for better removal from the louver assembly and in a manner to minimize the possibility of the separated rain being carried back into the air stream.

At this point the assembly advantages resulting from the configuration of the louver blade in this invention should be noted. With the alternating concave-convex surfaces on opposite sides of each louver blade and the alternate staggering of the traps, the louver assembly is readily built up to any desired length (the dimension extending transversely of the direction of air flow) by varying the number of louver blades used.

With the traps staggered on opposite sides of the louver blade, and each positioned at a respective concave surface, the identical louver blades can be stacked and the traps are inherently properly positioned for effective separation regardless of the number of louver blades used.

This particular configuration not only facilitates assembly and affords a variety of assembly lengths with the same basic elements, but also achieves optimum separation with a relatively small depth, i.e. the distance between inlet and outlet.

Attention will now be directed to the frame. Side walls 20 and 22 include inlet flanges 53 and 54 and outlet flanges 56 and 58. Two hook-shaped barriers 60 and 62 are provided on the inner faces of side walls 20 and 22 and project to a point in proximity with the end louver blades and are overlapped with the traps of the end louver blades. This overlapping arrangement of the traps and barriers prevents passage of rain through the assembly along the side walls. Waterseal caulking compound 64 can also be provided along the bottom ends of the side walls where they join the bottom wall to drain trapped rain to the inlet.

As stated above, the arrangement of the traps concentrates the separated rain at particular points in the louver assembly for better removal thereof from the assembly. To further facilitate removal of the separated rain from the louver assembly bottom wall 18 is arranged at an angle and slopes downwardly from the outlet to the inlet. Water caught in the traps drains down to the bottom wall and runs along the bottom wall to drain through the inlet opening. In some installations the louver assembly may be arranged in an exterior building wall 80 and it may be desirable to drain the water from a point spaced outwardly from the exterior wall. In this connection an extension sill 66 can be used with the bottom wall. The extension sill is positioned below the bottom wall and extends outwardly of the inlet to a downturned flange 68. The inlet of the louver assembly can be mounted flush with the exterior building wall and the extension sill carries and discharges the drainage at a point spaced outwardly from the wall.

The louver blades are connected in the frame by screws 70 which pass through the upper and lower walls and are received in openings 72 in the trap ends. The louver assembly may be completed by the attachment of a suitable mounting bracket 74 to the bottom, top and/or side walls of the frame.

Although but one embodiment of the present invention has been illustrated and described, it will be apparent to those skilled in the art that various changes and modifications may be made therein without departing from the spirit of the invention or from the scope of the appended claims.

We claim:
1. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, said louver blades arranged with the concave faces of one louver blade presented to the convex faces of an adjacent louver blade with said louver blades defining an undulating path having a plurality of changes in direction between said inlet and outlet, and trap portions arranged on opposite sides of each of said louver blades on the convex faces thereof with adjacent trap portions of each louver blade being arranged on opposite sides thereof and located in said path at said points of change of direction, said trap portions projecting outwardly of said convex faces into said paths and toward said inlet.

2. The louver assembly of claim 1 wherein said trap portions terminate in said paths in hook-shaped portions formed by a first portion extending from a respective louver blade into said path toward said inlet and a second portion spaced from said respective louver blade and extending from said first portion back toward said respective louver blade, and wherein the projection of the trap portions of adjacent louver blades into the path defined by said adjacent louver blades overlap.

3. The louver assembly of claim 1 wherein the concave faces of the arcuate segments of each of said louvers are alternately arranged with the convex faces thereof to define a smooth undulating flow path between said inlet and outlet.

4. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, the concave face of the arcuate segments of each of said louver blades being directed toward the convex face of an adjacent louver blade to thereby define an undulating flow path having a plurality of changes in direction between said inlet and outlet, and trap portions connected to said louver blades at the convex faces thereof and at said changes in direction and projecting outwardly of said convex faces into the flow path between adjacent louver blades, said trap portions being directed toward said inlet.

5. The louver assembly of claim 4 wherein the concave faces of the arcuate segments of each of said louver blades are alternately arranged with the convex faces thereof.

6. The louver assembly of claim 4 wherein said frame includes a wall portion extending between said inlet and outlet and sloping downwardly from said outlet toward said inlet so that said wall portion will serve as a drain directing the media entrapped in said trap portions toward said inlet where said entrapped media is rain or the like.

7. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, the concave face of the arcuate segments of each of said louver blades being directed toward the convex face of an adjacent louver to thereby define an undulating flow path between said inlet and outlet, trap portions connected to said louver blades at the convex faces thereof and extending into the flow path between adjacent louvers, said trap portions being directed toward said inlet, said frame includes a wall portion extending between said inlet and outlet and sloping downwardly from said outlet toward said inlet so that said wall portion will serve as a drain directing the media entrapped in said trap portions toward said inlet where said entrapped media is rain or the like and also includes side wall portions each including
   barrier members disposed on the inner surfaces thereof and extending toward the end louver blades,
   said barrier members being alternately arranged with and overlap the trap portions of said end louver blades extending toward said side walls,
   and said barrier members terminating in a hook-shaped end formed by a first portion extending from said side wall and a second portion extending from said first portion back toward said side wall.

8. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, the concave face of the arcuate segments of each of said louver blades being directed toward the convex face of an adjacent louver to thereby define an undulating flow path between said inlet and outlet, trap portions connected to said louver blades at the convex faces thereof and extending into the flow path between adjacent louvers, said trap portions being directed toward said inlet, said frame includes side wall portions each including
   barrier members disposed on the inner surfaces thereof and extending toward the end louver blades,
   said barrier members being alternately arranged with and overlap the trap portions of said end louver blades extending toward said side walls,
   and said barrier members terminating in a hook-shaped end formed by a first portion extending from said side wall and a second portion extending from said first portion back toward said side wall.

9. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, the concave face of the arcuate segments of each of said louver blades being directed toward the convex face of an adjacent louver blade to thereby define an undulating flow path between said inlet and outlet, trap portions connected to said louver blades at the convex faces thereof and projecting outwardly of said convex faces into the flow path between adjacent louver blades, said trap portions being directed toward said inlet and comprising a first portion extending from a respective one of said louver blades toward said inlet and a second portion extending from the termination of said first portion back toward said respective one of said louver blades, and wherein the extension of the trap portions of adjacent louver blades into the path defined by said adjacent louver blades overlap.

10. The louver assembly of claim 9 wherein said louver blades each terminate at said outlet at substantially the midpoint of an arcuate segment and wherein the trap portions at the terminal arcuate segment extend into said paths parallel to said outlet and in turn terminate in generally hooked-shaped portions directed toward said inlet and back toward their respective louver blade.

11. A louver assembly comprising, in combination, a frame defining relatively spaced inlet and outlet, a plurality of louver blades supported in said frame and relatively spaced in a direction transverse to the direction between said inlet and outlet to permit flow from said inlet to said outlet, each of said louver blades including a plurality of generally arcuate concave-convex segments arranged serially in the direction of flow between said inlet and outlet, said louver blades arranged with the concave faces of one louver blade presented to the convex faces of an adjacent louver blade with said louver blades defining an undulating path having a plurality of changes in direction between said inlet and outlet, and trap portions arranged on opposite sides of each of said louver blades on the convex faces thereof with adjacent trap portions of each louver blade being arranged on opposite sides thereof and located in said path at said points of change of direction, said trap portions projecting outwardly of said convex faces into said paths toward said inlet and terminate in said paths in hooked-shaped portions formed by a first portion extending from a respective louver blade into said path toward said inlet and a second portion spaced from said respective louver blade and extending from said first portion back toward said respective louver blade.

References Cited
UNITED STATES PATENTS

| | | | |
|---|---|---|---|
| 1,896,656 | 2/1933 | Anderson | 55—440 |
| 1,928,706 | 10/1933 | Sillers | 55—440 X |
| 1,956,591 | 5/1934 | Gies | 55—440 X |
| 2,364,378 | 12/1944 | Levinson | 98—121 |
| 2,643,736 | 6/1953 | Smith | 55—442 X |
| 2,976,954 | 3/1961 | Irwin | 55—442 X |

FOREIGN PATENTS

| | | |
|---|---|---|
| 21,507 | 1902 | Great Britain. |
| 1,361,634 | 4/1964 | France. |

ROBERT A. O'LEARY, *Primary Examiner.*

MEYER PERLIN, *Examiner.*

M. A. ANTONAKAS, *Assistant Examiner.*